(12) United States Patent
Robbins

(10) Patent No.: US 7,793,540 B2
(45) Date of Patent: Sep. 14, 2010

(54) ROTOR UNBALANCE CORRECTION

(75) Inventor: William Edward Robbins, Bristol (GB)

(73) Assignee: Rolls Royce PLC, London (GB)

( * ) Notice: Subject to any disclaimer, the term of this patent is extended or adjusted under 35 U.S.C. 154(b) by 664 days.

(21) Appl. No.: 11/798,601

(22) Filed: May 15, 2007

(65) Prior Publication Data

US 2007/0277606 A1  Dec. 6, 2007

(30) Foreign Application Priority Data

Jun. 1, 2006  (GB) .................................. 0610812.0

(51) Int. Cl.
*G01M 1/16* (2006.01)
(52) U.S. Cl. ....................................................... 73/459
(58) Field of Classification Search ........................ None
See application file for complete search history.

(56) References Cited

U.S. PATENT DOCUMENTS

| 2,955,499 | A | * | 10/1960 | Soberski ...................... 82/173 |
| 3,044,304 | A | * | 7/1962 | Ten Bosch et al. ............ 73/462 |
| 3,935,746 | A | * | 2/1976 | Moll et al. ..................... 73/462 |
| 4,060,707 | A | * | 11/1977 | Olsson et al. .......... 219/121.68 |
| 5,237,505 | A | * | 8/1993 | Beebe .......................... 73/459 |
| 5,591,909 | A | * | 1/1997 | Rothamel et al. ............. 73/462 |
| 2005/0160810 | A1 | | 7/2005 | He et al. |

FOREIGN PATENT DOCUMENTS

| EP | 0 502 780 A1 | 9/1992 |
| EP | 1 586 883 A1 | 10/2005 |

\* cited by examiner

*Primary Examiner*—Robert R Raevis
(74) *Attorney, Agent, or Firm*—Oliff & Berridge, PLC

(57) ABSTRACT

A rotor such as a blisk B is balanced by determining the extent of any static or couple unbalance when the rotor is rotated about a test axis X while supported at a location surface 10 at which the rotor is supported in normal use. The location surface 10 is then modified, for example by removing material in a final machining operation, to eliminate the unbalance. For example the swash of the surface 10 may be altered and/or modification may be made to other location features (11) in order to cause the rotor to rotate, in normal operation, about an axis which is eccentric to the test axis X.

12 Claims, 2 Drawing Sheets

ROTOR UNBALANCE CORRECTION

BACKGROUND OF THE INVENTION

This invention relates to the correction of rotor unbalance, and is particularly, although not exclusively, concerned with a correction of unbalance of a rotor in the form of a bladed disc, or "blisk" of a gas turbine engine.

Components that rotate at high speed must be balanced if undesirable vibration and associated stresses are to be avoided. This is particularly the case for rotors of gas turbine engines.

In the past, bladed discs have been assembled by fitting individual blades to a central rotor disc. It has been possible to balance the assembled discs by using the mass variation between individual blades, so that the positions of individual blades can be changed to eliminate any out-of-balance that occurs. More recently, integral bladed discs have become more common. Such bladed discs are referred to as "blisks". With such structures, it is not possible to exchange individual blades, and so a different balancing method is required.

A rotating out-of-balance can take two forms. The first is static unbalance in which the centre of mass lies away from the rotational axis so that, if the rotor is supported in a frictionless manner, it will always come to rest in a position in which the centre of mass lies directly below the axis. A known method of correcting static unbalance is either to add an appropriate mass to the rotor at a position diametrically opposite the detected centre of mass, or to remove material from the same side of the axis as the centre of mass. The effect of such adjustments is to move the centre of mass to the rotational axis.

The second kind of rotating out-of-balance is dynamic unbalance which arises if out-of-balance forces are generated in different directions at different positions along the rotational axis of the rotor. Such forces give rise to a rotating couple unbalance when the rotor is rotated, and this can cause problems even if the rotor is in static balance.

As with static unbalance, it is known to correct couple unbalance by the addition or removal of material from the rotor. In both cases this involves a weight penalty, either from the direct effect of adding a balancing mass, or because the removal of material means that balancing lands need to be provided from which controlled material removal can be effected, and these balancing lands add to the weight of the component as a whole.

It is also known to correct static unbalance by making corrections during the final machining of location features, but such methods do not correct dynamic unbalance.

SUMMARY

According to the present invention there is provided a method of balancing a rotor, the method comprising the steps of:
  (i) supporting the rotor by means of a location feature of the rotor;
  (ii) rotating the rotor about a test axis;
  (iii) determining the characteristics of any dynamic unbalance of the rotor when rotated about the test axis;
  (iv) calculating the eccentric and/or angular offsets of the rotational axis from the test axis required to eliminate the dynamic unbalance; and
  (v) modifying the location feature of the rotor so that, when the rotor is supported by means of the modified location feature, the rotational axis of the rotor is displaced from the test axis by the required eccentricity and/or angle.

The present invention is a method for achieving dynamic balance of a rotating member. The prior art teaches of correcting static unbalance, but this can only be achieved in one plane which results in a couple unbalance when the rotor is operational. The present invention achieves dynamic balance by accounting for both static and couple unbalances.

The modification of the location feature preferably consists of the removal of material from the locating feature. This may be achieved by appropriately adapting the final machining operation of the location feature. Other forms of modification could be used, for example the application of adaptor rings or other elements to the locating features to achieve the required modification.

The location feature may be a radial mounting surface, for example an axial end surface of the rotor, by which the rotor is secured to an adjacent rotating component. Alternatively, the location feature may be an internal or external cylindrical surface by which the rotor is mounted for rotation in or on a bearing.

A method in accordance with the present invention may also include, following step (ii), a determination of any static unbalance of the rotor in terms of the distance of the centre of mass of the rotor from the test axis, and a determination of the displacement of the centre of mass which will arise as a result of the modification of the location feature in step (v), and performing a further modification of the location feature to cause the centre of mass to lie substantially on the rotational axis with the required angular offset from the test axis.

For a better understanding of the present invention, and to show more clearly how it may be carried into effect, reference will now be made, by way of example, to the accompanying drawings, in which:—

DETAILED DESCRIPTION

Figure 1:
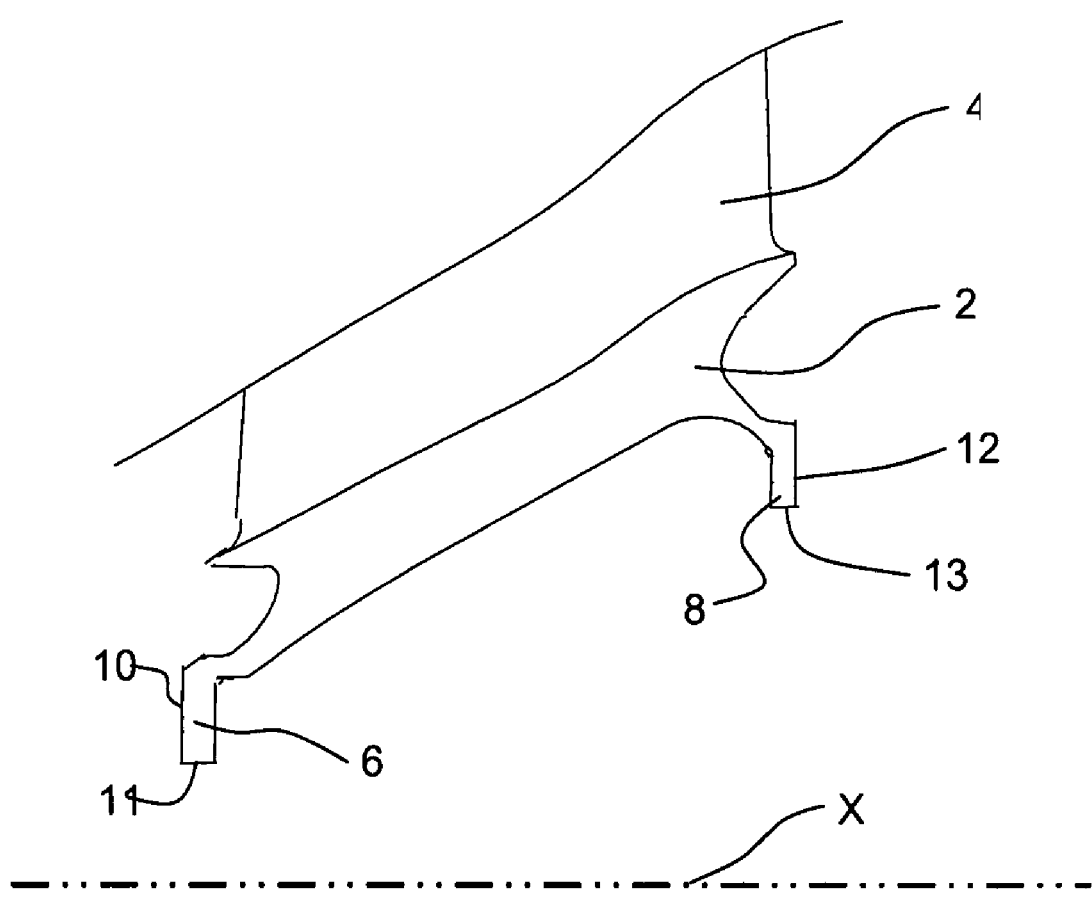
FIG. 1 is a partial sectional view of a blisk of a gas turbine engine.

The blisk shown in FIG. 1 may, for example, be part of a compressor or turbine of a gas turbine engine. It comprises an annular platform 2 carrying a circumferential array of blades 4. The blades 4 are integral with the platform 2, either because the platform 2 and blades 4 have been formed as a single piece, or because the blades 4 have been formed separately and permanently attached to the platform 2 by welding or some such appropriate means.

The platform 2 has, at each axial end (with respect to the rotary axis X of the blisk) a front flange 6 and a rear flange 8. When assembled in an engine, the blisk is secured to adjacent components by bolts or other fasteners (not shown) extending parallel to the axis X and passing through the flanges 6, 8. Axially outer surfaces 10, 12 and inner peripheries 11, 13 of the flanges 6, 8 serve as location features and determine the precise position and orientation of the blisk as a whole relatively to the adjacent components and to the axis X.

In practice, blisks as exemplified by FIG. 1 are rarely perfectly balanced at the end of their manufacturing process. It is common for dimensional changes of close to 1 mm to be required to balance the blisk.

Figure 2:
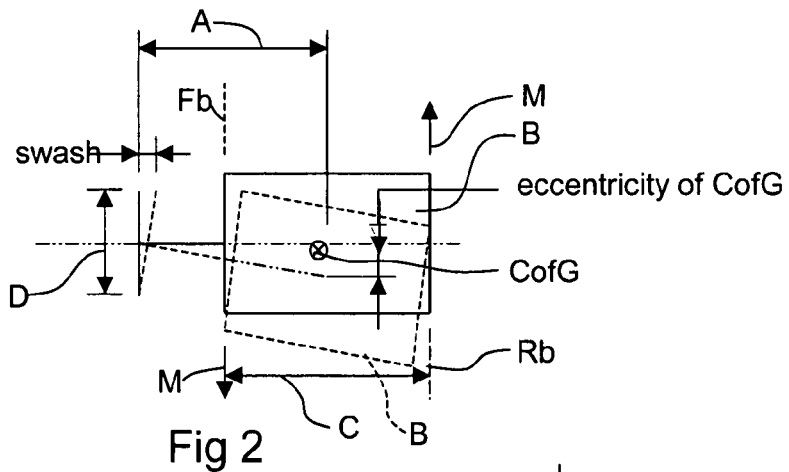
FIG. 2 diagrammatically represents the correction of dynamic unbalance of a rotor.

FIG. 2 represents the blisk of FIG. 1 (represented in FIG. 2 by the reference B) in dotted outline in its unfinished condition and in solid outline in its finished condition. The difference in orientation between the finished and unfinished conditions is shown greatly exaggerated in FIG. 2; in practice the difference is very small.

The blisk is mounted, at the front face 10, on a test machine which rotates the blisk about a test axis corresponding to the axis X in FIG. 1. It will be appreciated that the position of the rotational axis X with respect to the rotor will depend on the orientation of the location face 10 and the inner periphery 11 of the front flange 6. The test machine is set up so as to replicate, as far as possible, the component of the engine to which the rotor will be fixed, at the location face 10, when the engine is assembled.

A balancing test is then run on the test machine, and an output is generated representing both static and dynamic unbalance. It is then possible to calculate any required modification of the location face 10 and the inner periphery 11 in order to eliminate, or at least substantially reduce, both the dynamic and static unbalance. Referring to FIG. 2, the calculations are performed as follows:

The couple unbalance $M=\tan \alpha (Ip-Id)=(Fb-Rb)\times C/2$

Where:

Tan $\alpha$=Angle of swash in radians=swash/D (D=Diameter of location face 10)
Ip=Polar moment of inertia
Id=Diametral moment of inertia
Rb=Unbalance amount and angle measured at Rb (vector)
Fb=Unbalance amount and angle measured at Fb (vector)
C=Length between measuring planes Couple unbalance $M=\text{swash}(Ip-Id)/D=(Fb-Rb)\times C/2$ The degree of swash required to correct couple unbalance is therefore:

Swash=$(Fb-Rb)\times C\times D/2(Ip-Id)$ @angle of $Fb-Rb$

For a given component C, D, Ip and Id are constant and the degree of swash required to correct couple unbalance is therefore dependant on the initial couple unbalance of the component.

If the locating face 10 is modified by machining it so that it is given a swash angle as calculated above, the resulting rotational axis will be moved relative to the Centre of mass (or centre of gravity indicated by CofG in FIG. 2). The mass eccentricity (Es) due to the correcting swash is:

$Es=(Fb-Rb)\times C\times D/2(Ip-Id)\times A/D$ @angle of $Fb-Rb$ $Es=(Fb-Rb)\times C\times A/2(Ip-Id)$ @angle of $Fb-Rb$ A=Length from swash face to CofG The degree of eccentricity (E) required to correct static unbalance (Us) and eccentricity (Es) due to correcting swash is a vector sum as follows:

Eccentricity(E)=(Static unbalance(Us)/Mass of component(M))–Eccentricity(Es) due to correcting swash $E=(Us/M)-Es$ Static unbalance $(Us)=Fb+Rb$ @angle of $Rb+Fb$ $E=[(Fb+Rb)/M$@angle of $Rb+Fb+180°]-[(Fb-Rb)\times C\times A/2(Ip-Id)$@angle of $Fb-Rb]$ For a given component M, A, C, Ip and Id are constant and the eccentricity required to correct static unbalance and unbalance due to swash eccentricity is therefore dependant on the initial static and couple unbalance of the component.

Figure 3:
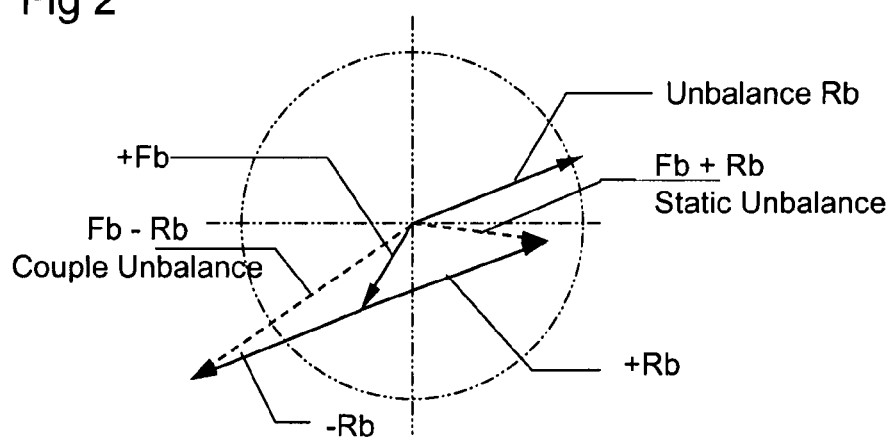
FIG. 3 is a vector diagram representing forces acting on the rotor of FIG. 2.

FIG. 3 is a vector diagram representing examples of both static and couple unbalance, from which it can be seen that the static unbalance is the vector sum of the forces at the measurement planes Fb and Rb, while the couple unbalance is represented by the difference between the couples at the planes Fb and Rb, since the couple at each plane is measured from a point midway between the planes, so that the moment arm is positive for one plane (Fb) and negative at the other (Rb).

Following the calculations set out above, the location features are machined to achieve the required degree of swash. This is done by performing the final machining of the face 10 so that it is inclined at the required angle, and in the required direction, to correct couple unbalance. The final machining also adjusts the inner periphery 11 so that the required eccentricity is achieved, both to correct the inherent static unbalance of the rotor and to adjust for the change in the position of the centre of gravity of the rotor resulting from the swash introduced at the face 10 to correct the couple unbalance.

Figure 4:
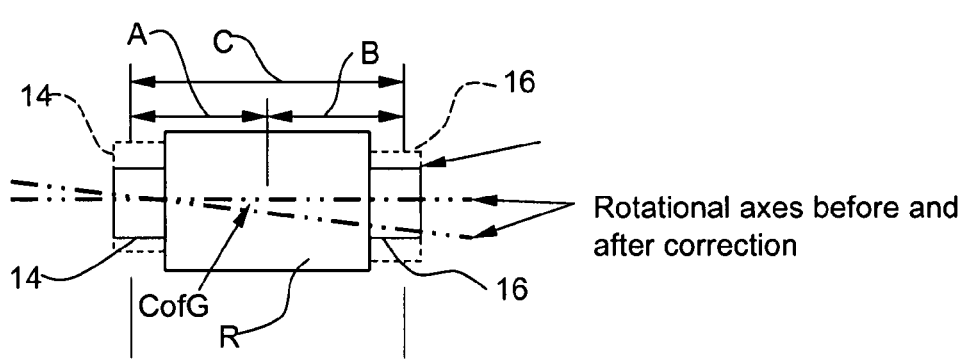
FIG. 4 corresponds to FIG. 2, but shows an alternative form of rotor.

FIG. 4 shows a rotor which, in use, will be supported by bearings. For this purpose, the rotor comprises a main body R having, at each axial end, a cylindrical bearing surface 14, 16. In FIG. 4, the final machined bearing surfaces 14, 16 are shown in solid outline, while the surfaces before final machining are shown in dotted outline.

For balance testing, the rotor is mounted in bearings at each end, using the unfinished bearing surfaces 14, 16 shown in dotted outline. For this arrangement, the calculations for determining the adjustments to be made to correct static and couple unbalance are as follows:

Couple unbalance=$\tan \alpha(Ip-Id)=(Fb-Rb)\times C/2$

Where:

Tan $\alpha$=Angle of swash in radians=Es/A (Es=Eccentricity of CofG)
Ip=Polar moment of inertia
Id=Diametric moment of inertia
Rb=Unbalance amount and angle measured at Rb (vector)
Fb=Unbalance amount and angle measured at Fb (vector)
C=Length between measuring planes/location diameters
A=Length from front location diameter to CofG of rotor
B=Length from rear location diameter to CofG of rotor Couple unbalance=$Es(Ip-Id)/A=(Fb-Rb)\times C/2$ $Es=(Fb-Rb)\times C\times A/2(Ip-Id)$ The eccentricity at the front (Esf) and rear (Esr) location diameters required to correct couple unbalance is therefore:

$Esf=(Fb-Rb)\times C\times A/2(Ip-Id)$ @angle of $Fb-Rb$ $Esr=(Fb-Rb)\times C\times B/2(Ip-Id)$ @angle of $Fb-Rb+180°$ For a given component C, A, B, Ip and Id are constant and the eccentricity at the front and rear location diameters required to correct couple unbalance is therefore dependant on the initial couple unbalance of the component.

The degree of eccentricity (E) required to correct static unbalance (Us) and eccentricity (Es) due to correcting swash is a vector sum as follows:

Eccentricity(E)=(Static unbalance(Us)/Mass of component(M))–Eccentricity(Es) due to Correcting couple $E=(Us/M)-Es$ Static unbalance$(Us)=Fb+Rb$@angle of $Rb+Fb$ $E=[(Fb+Rb)/M]-Es$ The degree of eccentricity at the front and rear location diameters (Ef and Er) required to correct static unbalance (Us) and eccentricity (Esf and Esr) due to correcting couple is a vector sum as follows:

$$Ef=[(Fb+Rb)/M@\text{angle of } Rb+Fb+180°]-[(Fb-Rb)\times C\times A/2(Ip-Id)@\text{angle of } Fb-Rb]$$

$$Er=[(Fb+Rb)/M@\text{angle of } Rb+Fb+180°]-[(Fb-Rb)\times C\times B/2(Ip-Id)@\text{angle of } Fb-Rb+180°]$$

For a given component M, C, A, B, Ip and Id are constant and the degree of eccentricity required to correct static and couple unbalance is therefore dependant on the initial unbalance of the component.

It will be appreciated that, in the case of a rotor supported at each end in bearings, the modification of the location features, in the form of the bearing surfaces 14, 16, is achieved by performing the final machining of the bearing surfaces in an eccentric manner so that the rotational axis defined by each bearing surface is adjusted radially, in a predetermined direction and to a predetermined extent with respect to the original form of the bearing surfaces 14, 16 as tested.

By using a balancing technique as described above, couple and static unbalance can be at least partially corrected. In some circumstances, final balancing may be accomplished by the conventional addition or removal of material, but the resulting weight penalty can be significantly reduced by comparison with a balancing process entirely in accordance with such conventional techniques, since balance correction lands can be considerably reduced in size. Since the technique of the present invention can correct substantial unbalances without a weight penalty, it is possible to relax tolerances on the initial manufacturing process for the rotor, which can provide substantial cost savings. Because balancing is achieved by physical correction by way of location feature modification, internal bending moments may be significantly reduced compared with conventional balancing techniques. This will result in improved rotor dynamics. Also, unbalance resulting from installation of the rotor is eliminated.

While the example relating to couple balance of the apparatus of FIG. 4 described above relates to a rotor supported by bearings, the invention can equally be applied to a rotor constrained by, supported by and fixed at either end to rotatable supports. Such rotor apparatus includes, by way of example only, a rotor disc which forms one of a plurality of rotor discs connected together to form a rotor drum. The present invention enables the balancing of individual rotor discs, including, but not limited to, those sandwiched between other rotor discs, as well as the balancing of an entire rotor drum which is rotatably mounted on and constrained by bearings.

Although the invention has been described in the context of the balancing of blisks for gas turbine engines, it can be applied to any rotating component.

The invention claimed is:

1. A method of balancing a rotor, the method comprising the steps of:
   (i) supporting the rotor by means of a location feature of the rotor, the location feature being a surface for mounting the rotor and being provided at an interface of the rotor and a support;
   (ii) rotating the rotor about a test axis X;
   (iii) determining the characteristics of any dynamic unbalance of the rotor when rotated about the test axis;
   (iv) calculating the eccentric and/or angular offsets from the test axis required to eliminate the dynamic unbalance; and
   (v) modifying the location feature of the rotor so that, when the rotor is supported by means of the modified location feature, the rotational axis of the rotor is displaced from the test axis by the required eccentricity and/or angular offset.

2. A method as claimed in claim 1, wherein the modification of the location feature comprises the removal of material from the locating feature.

3. A method as claimed in claim 1, wherein the modification of the location feature comprises applying an adaptor element to the locating feature.

4. A method as claimed in claim 1, wherein the location feature comprises a radial mounting surface of the rotor.

5. A method as claimed in claim 4, wherein the modification of the location feature comprises alteration of the swash of the radial mounting surface.

6. A method as claimed in claim 1, wherein the location feature comprises a cylindrical bearing surface of the rotor.

7. A method as claimed in claim 6, wherein the modification of the location feature comprises alteration of the radial offset of the bearing surface with respect to the rest of the rotor.

8. A method as claimed in claim 1, wherein, in steps (i) and (ii), the rotor is supported at one end only.

9. A method as claimed in claim 1, wherein, in steps (i) and (ii), the rotor is supported at opposite axial ends.

10. A method as claimed in claim 1, wherein the method further comprises the steps of:
   (vi) determining the eccentricity of the centre of mass of the rotor with respect to the test axis;
   (vii) calculating displacement of the centre of mass caused by the modification of the location feature; and
   (viii) performing a further modification of the location feature to reduce or eliminate static unbalance of the rotor.

11. A rotor balanced in accordance with claim 1.

12. A rotor as claimed in claim 11, wherein the rotor is a blisk for a gas turbine engine.

* * * * *

UNITED STATES PATENT AND TRADEMARK OFFICE
CERTIFICATE OF CORRECTION

PATENT NO. : 7,793,540 B2  Page 1 of 1
APPLICATION NO. : 11/798601
DATED : September 14, 2010
INVENTOR(S) : William Edward Robbins It is certified that error appears in the above-identified patent and that said Letters Patent is hereby corrected as shown below:

Title page,
Item [73], Assignee, "Rolls Royce PLC", assignee should read -- Rolls-Royce PLC --

Signed and Sealed this

Twenty-third Day of November, 2010

David J. Kappos
*Director of the United States Patent and Trademark Office*